(12) United States Patent
Shimizu et al.

(10) Patent No.: US 7,929,223 B2
(45) Date of Patent: Apr. 19, 2011

(54) LENS BLOCK, LENS, HOLDER FOR HOLDING THE LENS BLOCK, AND PROJECTOR USING THE LENS HOLDER

(75) Inventors: Hitoshi Shimizu, Saitama (JP); Nobuko Arima, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 688 days.

(21) Appl. No.: 11/528,471

(22) Filed: Sep. 28, 2006

(65) Prior Publication Data

US 2007/0076309 A1 Apr. 5, 2007

(30) Foreign Application Priority Data

Sep. 30, 2005 (JP) ................ P2005-286063
Sep. 30, 2005 (JP) ................ P2005-286064

(51) Int. Cl.
*G02B 7/02* (2006.01)
(52) U.S. Cl. ...................... 359/811; 359/819
(58) Field of Classification Search .......... 359/811, 359/813, 815, 819, 821, 822
See application file for complete search history.

(56) References Cited

U.S. PATENT DOCUMENTS

| 4,275,962 A * | 6/1981 | Midorikawa et al. ........ 355/1 |
| 2002/0186478 A1 | 12/2002 | Watanabe et al. |
| 2004/0252383 A1 | 12/2004 | Hamada |

FOREIGN PATENT DOCUMENTS

| CN | 1116315 A | 2/1996 |
| GB | 2343966 A | 5/2000 |
| JP | 59-68710 A | 4/1984 |
| JP | 62-153908 A | 7/1987 |
| JP | 6-59806 A | 3/1994 |
| JP | 11-344657 A | 12/1999 |
| JP | 2000-187274 A | 7/2000 |
| JP | 2002-251769 A | 9/2002 |
| JP | 2002-267915 A * | 9/2002 |
| JP | 2002-365560 A | 12/2002 |
| JP | 2003-114479 A | 4/2003 |
| JP | 2004-87718 A | 3/2004 |
| JP | 2004-212822 A | 7/2004 |
| JP | 2004-347646 A | 12/2004 |
| JP | 2005-513523 A | 5/2005 |
| JP | 2006-23668 A | 1/2006 |
| WO | WO 03/052481 A2 | 6/2003 |

* cited by examiner

*Primary Examiner* — Ricky L Mack
*Assistant Examiner* — Brandi N Thomas
(74) *Attorney, Agent, or Firm* — Birch, Stewart, Kolasch & Birch, LLP

(57) ABSTRACT

A plurality of lens elements and spacer rings 30-38 for constituting a part of an optical system are inserted into a lens-barrel-like jig 40 in predetermined order. A reception portion 43 for receiving the lens element 38 which will be first inserted is formed in the jig 40. When inserted into the jig 40, the lens elements 30-38 are brought into abutment against one another in one way of the optical axis so that spaces among the lens elements 30, 32-34, 36 and 38 are positioned. After that, adhesive is applied to at least three circumferential places of the outer circumference of each abutment portion where the lens elements and spacer rings 30-38 abut against each other, through opening portions 41 provided in the outer circumference of the jig 40. Thus, the plurality of lens elements and spacer rings 30-38 are formed into an integrated structure.

13 Claims, 8 Drawing Sheets

EXTRACTION DIRECTION

LENS BLOCK, LENS, HOLDER FOR HOLDING THE LENS BLOCK, AND PROJECTOR USING THE LENS HOLDER

BACKGROUND OF THE INVENTION

1. Technical Field

The invention relates to a lens block having a structure, which is configured so that a plurality of lens elements for constituting a part or all of an optical system can be handled integrally, a lens holder for holding the lens block, an a projector using the lens holder.

2. Description of the Related Art

There has been known an RPTV (Rear Projection TV) in which a projector unit is placed behind a large screen so as to project light on the screen (JP 2003-114479 A). The RPTV is widely used because it is cheaper in unit price per screen size than any other television such as a plasma TV or a liquid crystal TV. However, the RPTV has a defect in its thickness because the projector unit has to be put behind the screen.

Therefore, there has been proposed a low-profile RPTV in which a projection lens provided in a projector unit is folded substantially like a V-shape so that the length of the projection lens can be prevented from increasing the thickness-direction size (JP 2000-187274 A corresponding to GB 2343966 A).

The projection lens disclosed in JP 2000-187274 A has an optical path converting unit such as a prism, by which the optical axis of image light passing through a first optical lens group constituting a projection lens is bent at a fixed angle, and the image light with the bent optical axis is made incident on a second optical lens group. The first or second optical lens group is constituted by a plurality of lens elements. Particularly, large-diameter lens elements are used in the first lens group. It is therefore troublesome to handle the first or second optical lens group. It is desired to form the first or second optical lens group to have an integrated structure.

In the RPTV, reduction in the cost is required. Therefore, moldings made of plastic are used as many parts. Particularly in a body tube, a lens barrel, a lens frame, etc. for holding a plurality of lenses, prisms, etc., with high precision is required, so that the manufacturing cost increases. Therefore, those parts are often molded out of plastic materials with a mold.

A lens block constituted by a plurality of lens elements is held in a lens barrel in the related art. In the lens barrel, stepped portions are formed in its inner circumferential surface. Each stepped portion has an abutment surface parallel to an optical axis, which surface serves to adjust the center of the corresponding lens element, and an abutment surface perpendicular to the optical axis, which surface serves to position the corresponding lens element along the optical axis. A plurality of such stepped portions are formed in the inner circumference of the lens barrel so as to incorporate the plurality of lens elements. As a result, it is necessary to process or form the lens barrel so precisely that the cost of the lens barrel increases.

After the lens elements are incorporated in the lens barrel, projection resolution is examined or MTF is measured. When adverse influence of misalignment of the optical axis is detected, the lens elements are removed from the lens barrel, assembled and adjusted again.

Therefore, there has been known a lens system assembling method in which lens elements are fixedly bonded before and behind spacer rings (JP Sho.59-68710A). In this assembling method, lens elements which have not been centered are disposed before and behind spacer rings, and their optical axes are adjusted and aligned. Thereafter, an adhesive is applied to gaps between the lens elements and the spacer rings so as to temporarily fix them. A lens block fixed temporarily is inserted into a mold. Insert molding of resin is then performed all over the periphery of the lens block. Thus, a lens barrel made of resin is formed in the outer circumference of the lens block.

SUMMARY OF THE INVENTION

However, in the assembling method disclosed in JP Sho.59-68710, molten resin is injected to the periphery of the lens block in the mold. There is a fear that the lens elements or the spacer rings may be melted if they are made of materials whose melting temperature is equal to or lower than the temperature of the injected molten resin. Particularly when the lens elements or the spacer rings are made of a plastic material, there may occur a problem that the lens elements or the spacer rings are partially melted so that their positions are shifted.

The lens elements, which have not been centered, should be centered and adjusted before and behind the spacer rings while being mounted on the spacer rings. This work becomes very difficult because the lens elements have not been positioned.

The invention was developed in view of the above circumstances. It is an object of the invention to provide a lens block having an integrated structure which can be built up regardless of the material of lens elements and which can be built up using an assembling method allowing an alignment work to be performed easily. It is another object of the invention to provide a lens holder for the lens block, and a projector using the lens holder. It is another object of the invention to provide a method for manufacturing a lens block so that an alignment work can be performed easily. It is further another object of the invention to provide a jig for use in the method for manufacturing a lens block.

In order to attain the foregoing objects, according to an aspect of the invention, a lens block includes a plurality of lens elements for constituting a part or all of an optical system. The lens elements are brought into abutment against one another in one way of an optical axis direction in a predetermined order so that the spaces among the lens elements are positioned. An adhesive is then applied to at least three positions, which are outside each abutment portion where the lens elements abut against each other and are arranged in a circumferential direction of each abutment portion, so that the plurality of lens elements can be handled integrally.

In the case where the lens block is configured so that a spacer ring is inserted between a part of the lens elements, the adhesive may be applied to at least three positions, which are outside each abutment portion where the lens elements abut against each other and each abutment portion where the lens element and the spacer ring abut against each other and are arranged in a circumferential direction of each abutment portion, so that the plurality of lens elements can be handled integrally. It is preferable that the positions to which the adhesive is applied are arranged at regular intervals in the circumferential direction.

To manufacture such a lens block, it is preferable to use a jig like a lens barrel. The jig may include a cylindrical portion, a reception portion, a plurality of positioning-surface portions and a plurality of opening portions. The lens elements are inserted into the cylindrical portion so that the lens elements are aligned in the predetermined order. The reception portion is provided at an end of the cylindrical portion in an insertion direction. The reception portion receives the lens element first inserted into the cylindrical portion. The positioning-surface portions are provided in an inner circumferential surface of the cylindrical portion. The positioning-surface portions align centers of the lens elements. The opening portions are formed through the cylindrical portion at the positions to which the adhesive is applied.

It is desired that adjacent ones of the lens elements have one and same diameter, or that of adjacent ones of the lens elements, one disposed down stream in an insertion direction has a smaller diameter than the other disposed upstream in the insertion direction.

The lens block formed thus is held in a lens holder and incorporated in a product. The lens holder includes a holding unit for positioning and holding the lens block in a predetermined position, and an attachment unit for positioning and attaching the lens block in a predetermined position. The attachment unit is a unit for attaching the lens block to a predetermined position of a product such as a projector. For example, an attachment portion is formed so that the attachment portion can be attached to a housing by screwing etc.

The holding unit may include a cylindrical portion and a positioning unit. The cylindrical portion covers at least a part or all of an outer circumference of the lens block. The positioning unit is provided in the cylindrical portion. The positioning unit positions the lens block in the optical axis direction and a direction crossing the optical axis direction. Of the positioning unit, an axially positioning unit may be constituted by a reception portion for receiving an edge of the lens block from one way of the optical axis direction, and a press ring which is attached to an upstream end (opposite end to the aforementioned one way) of the cylindrical portion in the aforementioned one way so as to press the lens block onto the reception portion. It is desired to form this press ring so that the press ring can be attached to the cylindrical portion easily by screwing.

The cylindrical portion may be made up of a plurality of divided parts, for example, two divided parts formed by cutting the cylindrical portion radially or straight lines passing the optical axis. In this case, the plurality of divided parts are combined in the lens block from the direction crossing the optical axis. Then, the divided parts are fixed by a fixation means such as screwing from the direction in which the divided parts are combined. Thus, the cylindrical portion is formed. In this case, it will go well if the reception portion is provided inside the cylindrical portion so as to receive an edge of the lens block from an opposite direction to the aforementioned one direction, and a press portion for pressing the lens block onto the reception portion is provided inside the cylindrical portion closely to the opposite direction to the aforementioned one direction. In this case, the press portion as well as the reception portion can be formed integrally in the cylindrical portion. Thus, the cost can be reduced because the press ring is not used.

The lens holder formed thus is used directly in a product such as a projector. In this case, there may be provided a fixing unit by which the lens holder positioned in a part of a housing of the projector by a positioning unit is fixed so that the lens block can form a part of a projection lens.

According to another aspect of the invention, a method for manufacturing a lens block includes: inserting lens elements into a lens-barrel-like jig so as to align the lens elements in a predetermined order; bringing a first inserted lens group into abutment against an insertion-direction end of the jig; and then applying an adhesive to at least three positions, which are on outside each abutment portion where the lens elements abut against each other and are arranged in a circumferential direction of each abutment portion, through a plurality of opening portions provided in an outer circumference of the jig In the case where spacer rings are inserted between the lens elements, the adhesive may be applied to at least three positions, which are outside each abutment portion where the lens elements abut against each other and each abutment portion where the lens elements and the spacer rings abut against each other and are arranged in the circumferential direction of each abutment portion.

According to a further another aspect of the invention, a jig includes a cylindrical portion, a reception portion, a plurality of positioning-surface portions and a plurality of openings. The lens elements are inserted into the cylindrical portion so that the lens elements are aligned in the predetermined order. The reception portion is provided in an insertion-direction end of the cylindrical portion. The reception portion receives the lens element, which is first inserted into the cylindrical portion. The positioning-surface portions are provided in an inner circumferential surface of the cylindrical portion. The positioning-surface portions align centers of the lens elements. The opening portions are formed through the cylindrical portion in the positions to which the adhesive is applied. Before bonding, for example, jig rods can be inserted from the opening portions to perform decentration adjustment etc. upon each lens element. Thus, adjustment can be performed easily.

According to the lens block described above, the plurality of lens elements are brought into abutment against each other, or the plurality of lens elements including the spacer rings are brought into abutment against each other. In this state, the plurality of peripheral abutment portions are fixedly bonded by adhesive simply. Accordingly, the lens block is manufactured easily. The lens block can have a structure in which the lens elements are integrated regardless of their different materials. Further, when the lens block is manufactured using the jig, the lens elements can be positioned surely at predetermined intervals. Thus, the lens block can be manufactured with high precision. For example, when the jig rods are inserted through opening portions before bonding, decentration or the like can be adjusted. Thus, fine adjustment can be performed easily and simply. According to the lens holder for the lens block and the projector using the lens holder, which have the configuration set forth above, the lens block has an integrated structure so that the lens block can be handled easily.

According to the method set forth above, the plurality of lens elements or the plurality of lens elements including the spacer rings are brought into abutment against each other so as to be positioned at predetermined intervals. The adhesive is applied to at least three positions, which are outside each portion where the lens elements or the lens elements including the spacer rings are positioned in abutment against each other and are arranged in the circumferential direction of each portion. Thus, the lens block is manufactured with an integrated structure. Accordingly, it is easy to manufacture the lens block. Since the lens block can be manufactured only by bonding, the integrated structure can be achieved even by the lens elements of different materials. When the jig is used, positioning for alignment with an optical axis becomes easy and simple. Further, by use of such a jig, each lens element inserted in to a cylindrical portion can be positioned in the optical axis direction and radial direction of the lens element. Accordingly, for example, when jig rods are inserted through opening portions before bonding, decentration of each lens element can be adjusted finely. Thus, fine adjustment can be performed easily and simply.

DETAILED DESCRIPTION OF EXEMPLARY EMBODIMENTS

Figure 1:
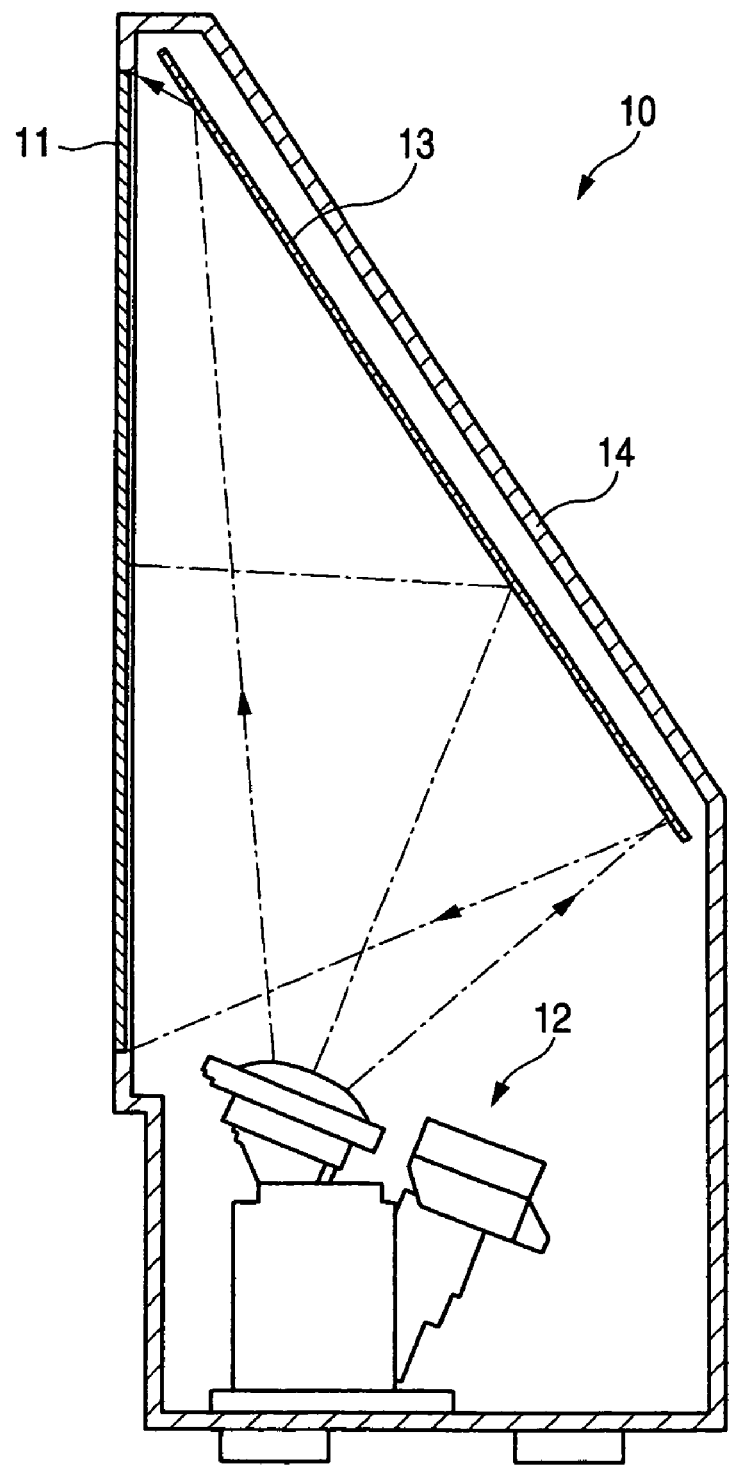
FIG. 1 is an explanatory view showing the configuration of a rear projector.

As shown in FIG. 1, a rear projector 10 has a transmission-type rear screen 11 on which an image is projected, a project or unit 12 for generating image light from illumination light and emitting the image light, and a back mirror 13 for reflecting the image light emitted from the projector unit 12 toward the rear screen 11.

The projector unit 12 and the back mirror 13 are provided inside a housing 14. The rear screen 11 is provided in an opening portion of the housing 14. The rear screen 11 has a rectangular shape having longer sides horizontally. The rear screen 11 is irradiated with image light from the rear side, and an image projected thereon is viewed from the front side. The back mirror 13 has a trapezoidal shape whose upper side is long and whose lower side is short. The back mirror 13 is inclined to the rear screen 11.

Figure 2:
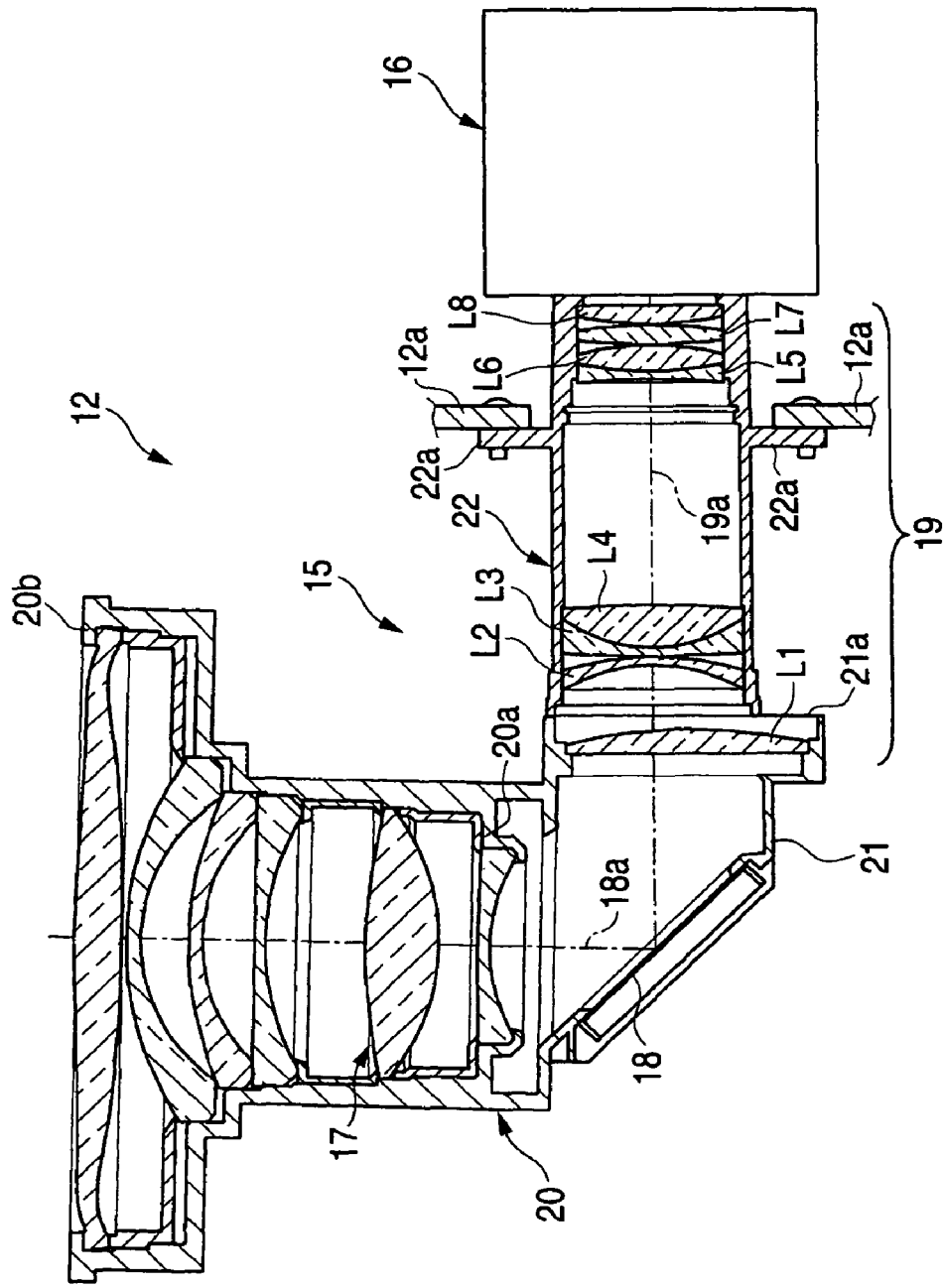
FIG. 2 is a sectional view schematically showing a projection lens.

The projector unit 12 has a projection lens 15 and an image light generating portion 16 as shown in FIG. 2. Energy distribution of illumination light radiated from a light source is equalized by a light guiding unit such as a rod integrator. The image light generating portion 16 receives and optically modulates the illumination light so as to generate image light. By the projection lens 15, the image light generated by the image light generating portion 16 is projected on the rear screen 11.

The projection lens 15 is constituted by a first lens group 17, an optical path bending mirror 18 and a second lens group 19. The second lens group 19 has a primary optical axis 19a parallel to the path of image light emitted from the image light generating portion 16. The optical path bending mirror 18 is a flat mirror, which is provided between the first lens group 17 and the second lens group 19. By the optical path bending mirror 18, the primary optical axis 19a of the color-composite image light is bent at an angle other than a right angle, for example, at an acute angle. The first lens group 17 is provided to face the back mirror 13. Incidentally, a prism may be used in place of the optical path bending mirror 18.

The first lens group 17 forms a focus lens of the projection lens 15. The first lens group 17 is a lens block having an integrated structure in which a plurality of lens elements have been fixed by an adhesive. The lens group 17 is held by a first lens holding frame 20. A stepped portion 20a and a press portion 20b are provided integrally in the first lens holding frame 20. The first lens holding frame 20 is made up of a plurality of radially divided parts. The stepped portion 20a receives an edge of a part of the lens elements of the lens block from one way of an optical axis 18a. The press portion 20b is provided in an opposite end of the first lens holding frame 20 to the aforementioned one way. The press portion 20b presses the lens block onto the stepped portion 20a. Thus, in the first lens holding frame 20, only the stepped portion 20a and the press portion 20b are formed simply. Therefore, it is not necessary to use a plurality of stepped portions and press rings for positioning the lens elements as in the related art. Accordingly, the lens block can be produced at a low cost. An optical-system holding portion 21 for mounting the optical path bending mirror 18 thereon is provided integrally in the first lens holding frame 20.

The second lens group 19 is made up of a plurality of lens elements L1 to L8 arrayed in this order from the rear screen 11 side. Of the lens elements L1 to L8, the lens element L1 is held by the optical-system holding portion 21, and the other lens elements L2 to L8 constituting the second lens group are held by a second lens holding frame 22. The second lens holding frame 22 is fixedly positioned by the optical-system holding portion 21.

Figure 3:
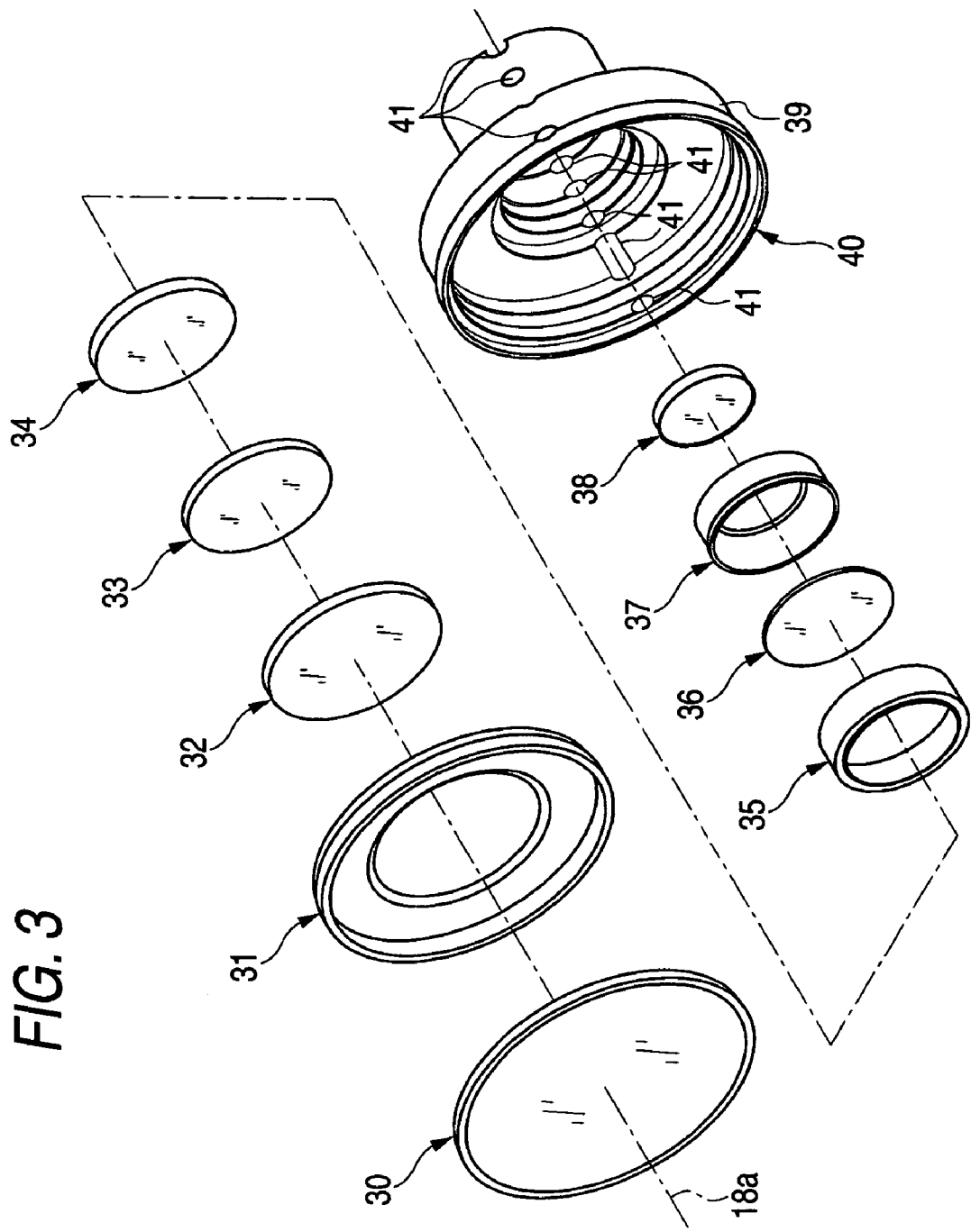
FIG. 3 is a perspective view showing a first lens group constituting a part of the projection lens, and a jig to be used for forming the first lens group into an integrated structure.

As shown in FIG. 3, the first lens group 17 has a configuration in which a first lens element 30, a first spacer ring 31, second to fourth lens elements 32 to 34, a second spacer ring 35, a fifth lens element 36, a third spacer ring 37 and a sixth lens element 38 are arrayed in this order from the rear screen 11 side. These lens elements and spacer rings are formed into an integrated structure by use of a lens-barrel-like jig 40. As is understood from FIG. 3, in the projection lens 15 for the rear projector, the diameter of the first lens element 30 serving as a front lens is extremely large. Due to the integrated structure of the lens elements, therefore, assembling becomes easy and simple.

The lens elements 30, 32-34, 36 and 38 have been centered. The diameters of the lens elements 30, 32-34, 36 and 38 decreases gradually in order of increasing distance from the rear screen 11. Accordingly, the inner surface of the jig 40 is formed into a cylindrical shape tapered rearward. In the first lens group 17, adjacent ones of the lens elements may have one and the same diameter, or all the lens elements may have one and the same outer diameter.

Figure 4:
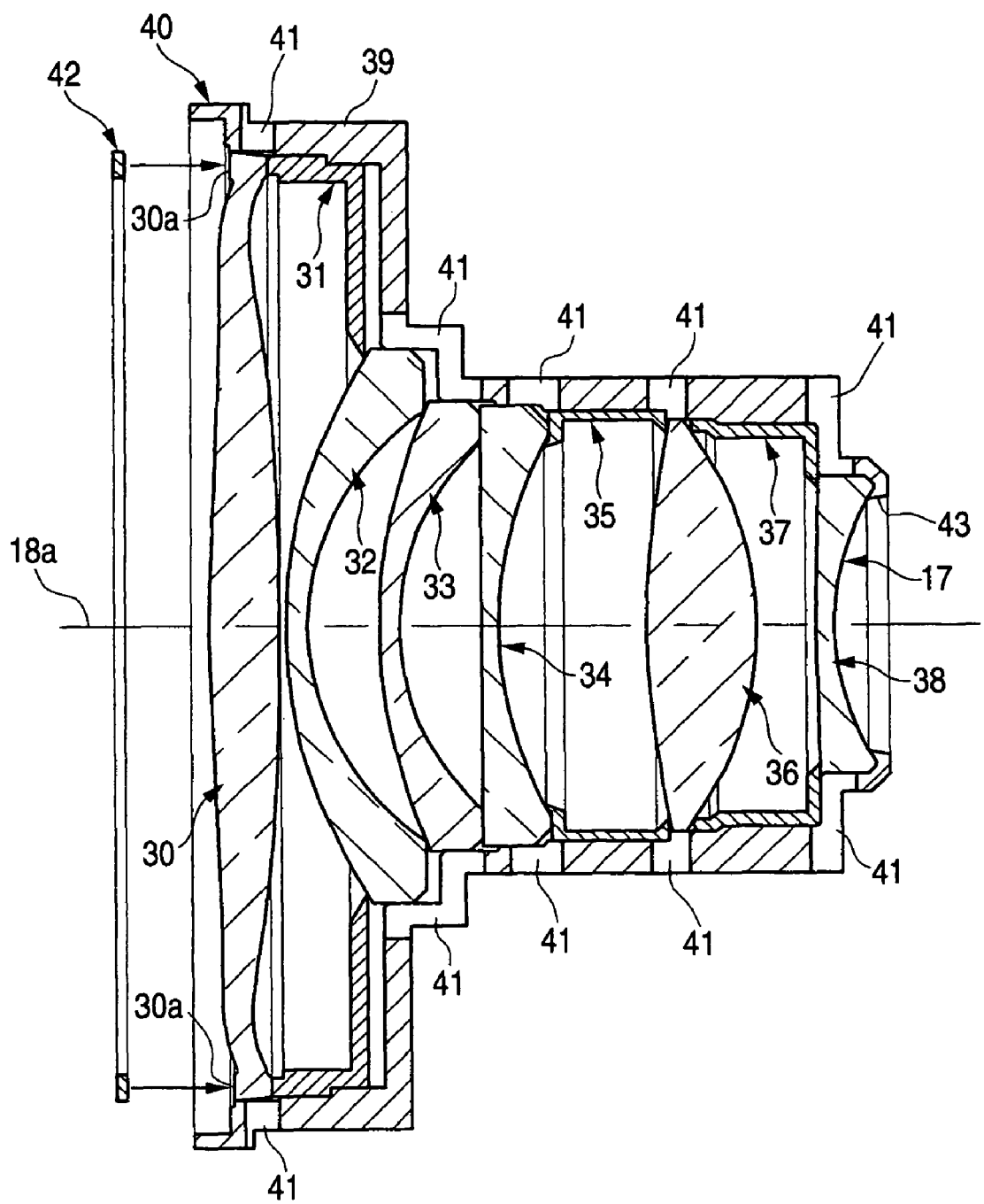
FIG. 4 is a sectional view showing a state where lens elements constituting the first lens group have been inserted into the jig.

The jig 40 has a cylindrical portion 39 to which the lens elements 30, 32-34, 36 and 38 and the spacer rings 31, 35 and 37 will be inserted. In the inner circumference of the cylindrical portion 39, a plurality of stepped portions are formed along the optical axis 18a in the inner circumferential surface of the cylindrical portion 39 as shown in FIG. 4. The front and rear surfaces, which form the stepped portions and are parallel to the optical axis 18a, function as positioning surfaces that abut against the outer circumferences of the lens elements 30, 32-34, 36 and 38 and the outer circumferences of the spacer rings 31, 35 and 37, respectively, and align the centers of the lens elements 30, 32-34, 36 and 38 and the centers of the spacer rings 31, 35 and 37. A plurality of opening portions 41 are formed in the outer circumference of the jig 40 so as to reach the inner surface of the jig 40. The opening portions 41 are formed into substantially circular shapes. The opening portions 41 are formed on a outer circumference corresponding to positions between the lens elements 32 to 34 and positions between the lens elements 30, 32, 34, 36 and 38 and the spacer rings 31, 35, 37 and in plural positions in a circumferential direction of the outer circumference, for example, in four equally-spaced positions on the outer circumference, respectively. Further, a reception portion 43 is formed in the rear inside of the cylindrical portion 39. The reception portion 43 abuts against the edge of the rear surface of the sixth lens element 38, which is inserted first, and receives the lens element 38.

Figure 5:
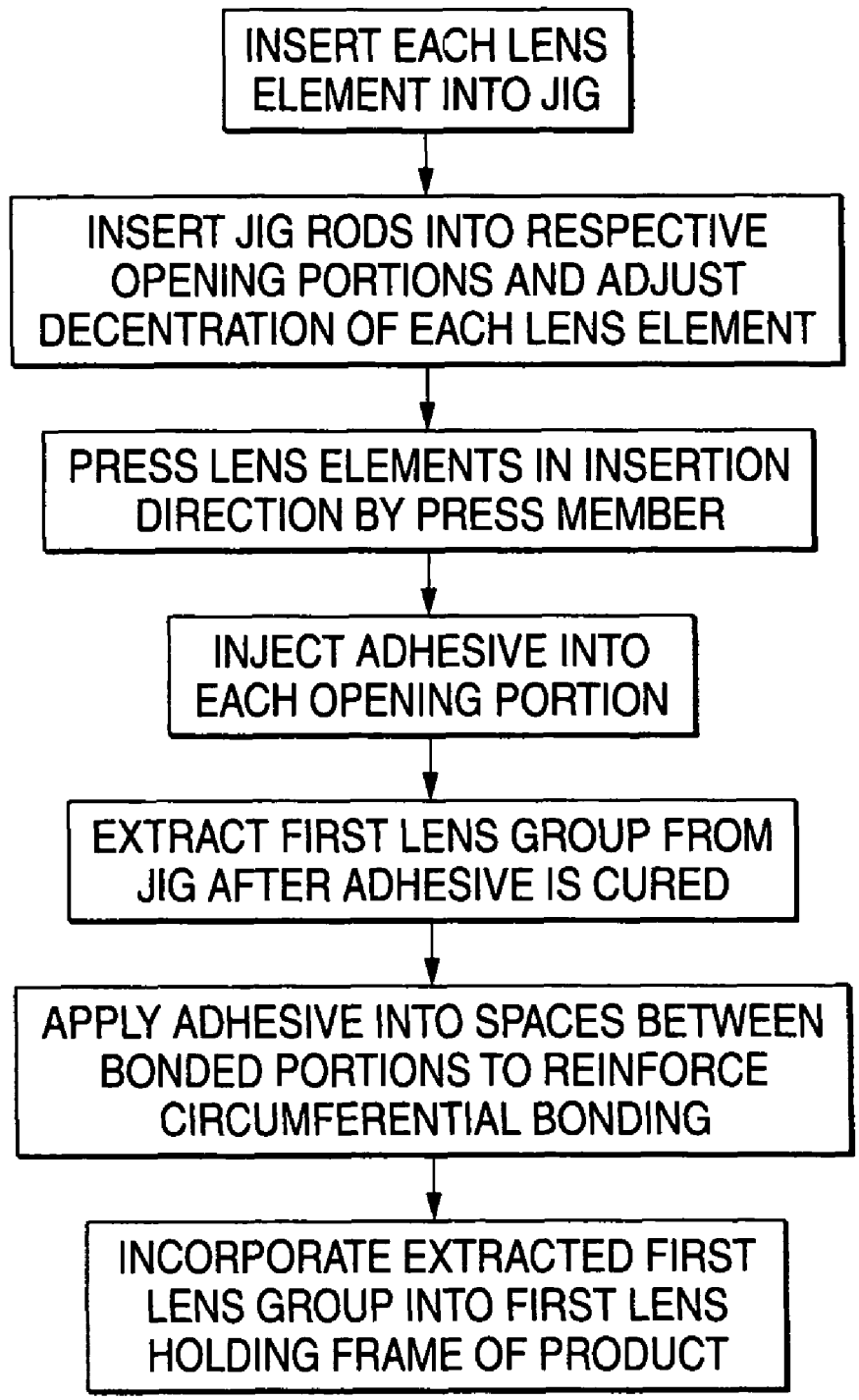
FIG. 5 is a flow chart showing a manufacturing procedure using the jig.

In assembling, as shown in FIG. 5, the lens elements 30, 32-34, 36 and 38 and the spacer rings 31, 35 and 37 are inserted into the jig 40 in turn from behind. In this event, for example, when the jig 40 is made of aluminum or another metal material, there is a fear that the inner surface of the jig 40 may damage the outer circumferences of the lens elements 30, 32-34, 36 and 38. It is therefore preferable to coat the inner surface of the jig 40 with Teflon (registered trademark).

After inserted into the jig 40, a front surface 30a (on the rear screen 11 side) of the first lens group 17 is pressed by a press member 42 functioning as a jig. It is desired that the press member 42 is a ring-like member pressing the first lens group 17 so as to abut only against the front surface of the edge of the first lens group 17 in order not to damage the range where projected light will pass. Thus, the lens elements 30, 32-34, 36 and 38 are brought into abutment against one another between the press member 42 and the reception portion 43 so as not to form clearance between the lens elements 30, 32-34, 36 and 38 and between the lens elements 30, 32-34, 36 and 38 and the spacer rings 31, 35 and 37.

In the state where the first lens group 17 is pressed by the press member 42, the adhesive is injected through the plurality of opening portions 41 so as to integrate the plurality of lens elements 30, 32-34, 36 and 38 and the spacer rings 31, 35 and 37. The adhesive may be injected by use of a plurality of injectors at a time, or for example may be injected in turn from a front array of the opening portions 41. An adhesive such as an ultraviolet-curing resin is preferably used as the adhesive. In this case, the adhesive can be cured only by irradiation with ultraviolet light. It is therefore possible to shorten the curing time.

Figure 6:
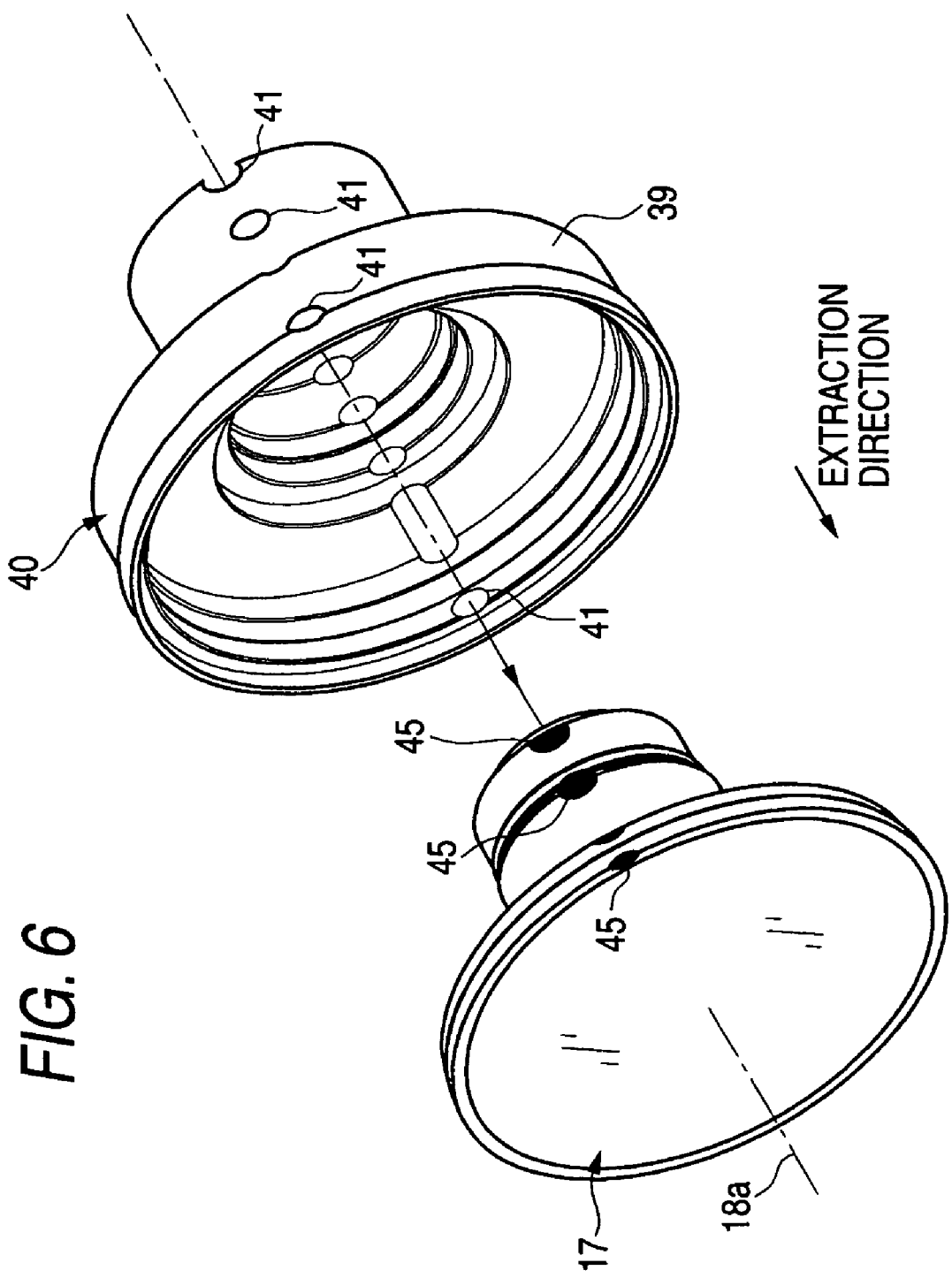
FIG. 6 is a perspective view showing a state where the first lens group has been extracted from the jig.

After the adhesive is cured, the first lens group 17 is extracted from the jig 40 in the direction of the optical axis 18a as shown in FIG. 6. In the extracted first lens group 17, the adhesive 45 is applied to spaces between the lens elements 30, 32-34, 36 and 38 and spaces between the lens elements 30, 32-34, 36 and 38 and the spacer rings 31, 35 and 37 so as to fixedly bond them with each other. Thus, the first lens group 17 can be handled integrally. Decentration may be adjusted finely after the first lens group 17 is extracted from the jig 40. In this case, after decentration is adjusted, the adhesive may be applied additionally between the positions to which the adhesive has been applied using the jig 40, so that the adhesive is applied to the whole circumference. Thus, the lens elements 30, 32-34, 36 and 38 and the spacer rings 31, 35 and 37 can be fixed firmly. The adhesive may be applied to the whole circumference for the sake of reinforcement even when decentration is not adjusted.

Figure 7:
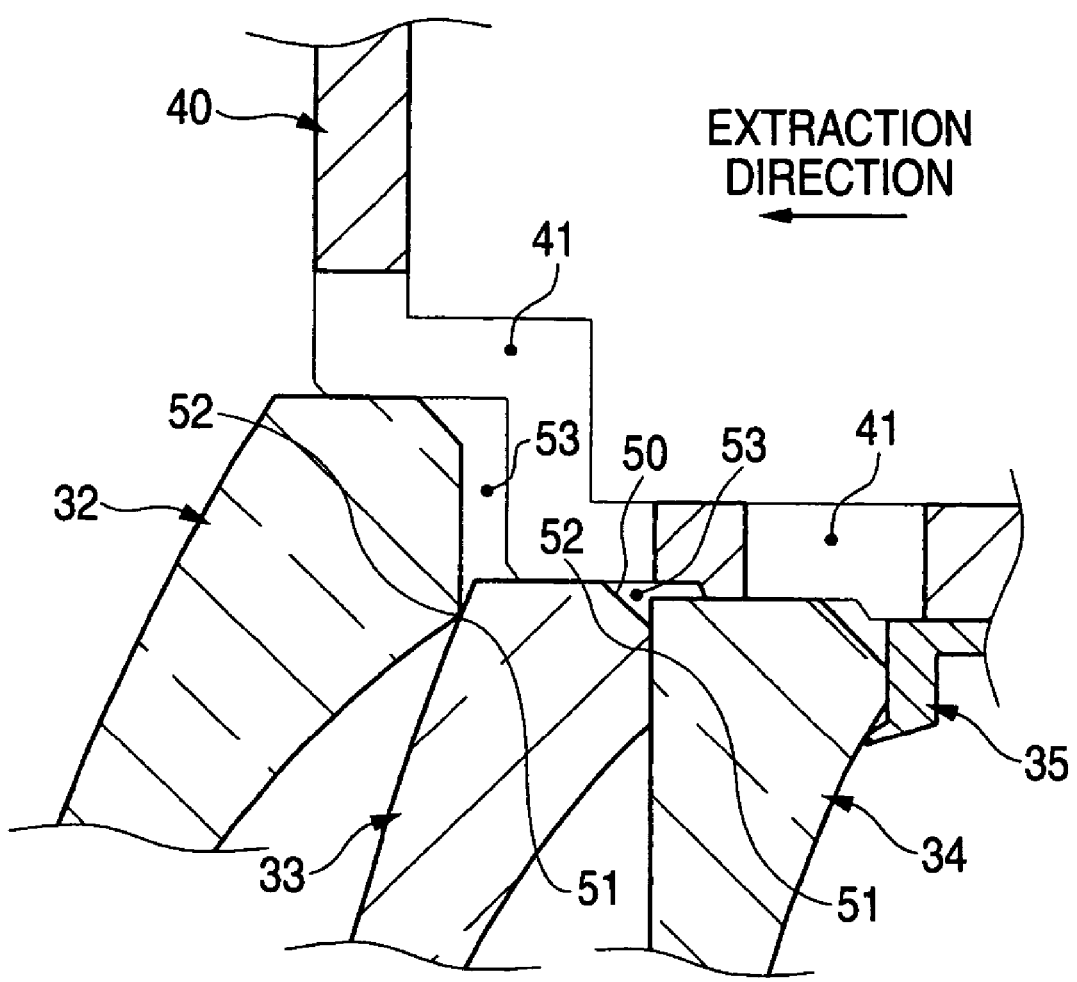
FIG. 7 is a main portion end view showing an embodiment when lenses are bonded to each other.

When the lens elements 30, 32-34, 36 and 38 are bonded with each other, it is necessary to be careful to prevent the excessive adhesive from being applied. For example, when there is a large difference in diameter between the adjacent lens elements 32 and 33 as shown in FIG. 7, a large space is formed between the outer circumference of an edge of the thrusting-side lens element 32 and the outer circumference of an edge 51 of the thrust-side lens element 33. Thus, excessive adhesive is put into the space surely. There is no fear that the excess adhesive is caught by the inner surface when the lens elements are extracted. However, there is a small difference in diameter between the adjacent lens elements 33 and 34. In such a case, a small space is formed between the outer circumference of an edge of the thrusting-side lens element 33 and the outer circumference of an edge 51 of the thrust-side lens element 34. It will go well if a chamfered portion 50 is formed in the edge of the thrusting-side lens element 33 so as to increase the space between the chamfered portion 50 and the outer circumference of the edge 51 of the thrust-side lens element 34. Thus, when the first lens group 17 is removed from the jig 40, the excess adhesive passes through the space from which the front large-diameter lens element 33 has been removed. There is no fear that the excess adhesive is caught by the inner surface of the jig 40. Even if a large amount of the adhesive is applied, the lens elements abutting against each other can prevent the adhesive from leaking inward (optical axis side) from each abutment portion 52 where the lens elements abut against each other. The shape of the abutment portion 52 may be formed into a point contact shape where the reception side is a surface in section, and the thrusting side is a point likewise, or formed into a surface contact shape where the reception side and the thrusting side are surfaces abutting against each other.

Figure 8:
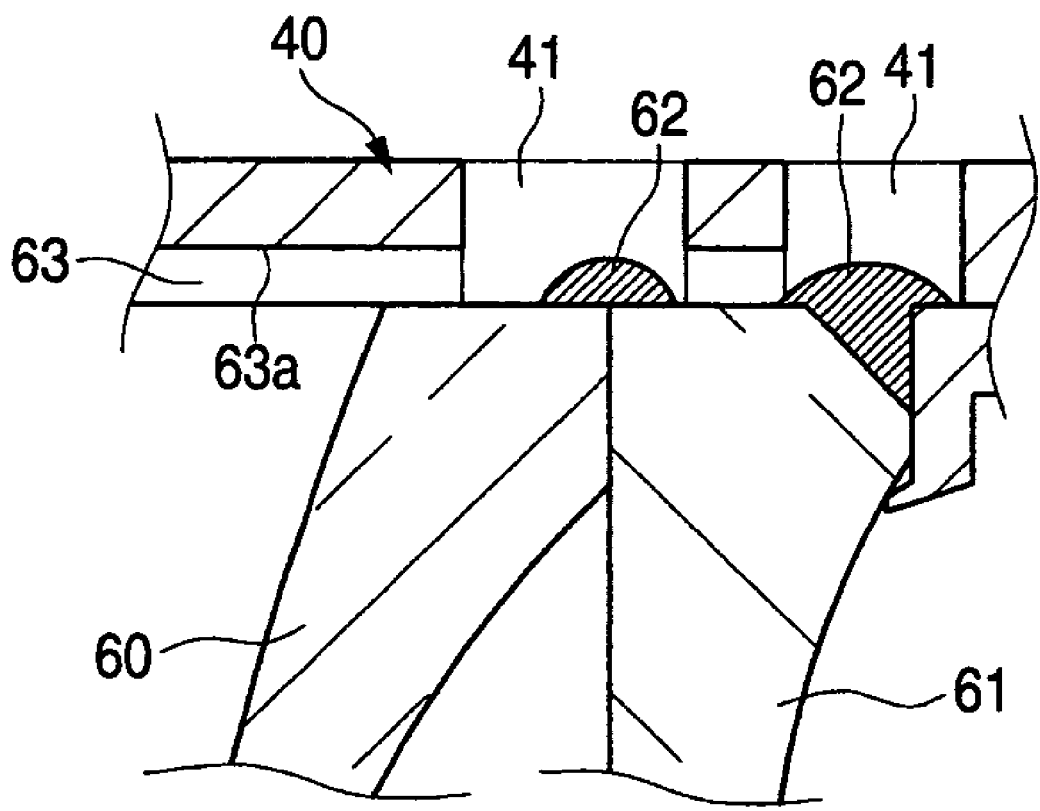
FIG. 8 is a main portion end view showing another embodiment when lenses are bonded to each other.

Though not configured in the aforementioned embodiment, assume that adjacent lens elements 60 and 61 have one and the same diameter as shown in FIG. 8. In this case, when adhesive 62 is applied to swell, the adhesive 62 is caught by the inner surface of the jig when the lens block is extracted. Thus, the lens block cannot be removed from the jig. Even when a chamfered portion is formed, there is a fear that the adhesive 62 swells. In this case, a groove 63 may be therefore formed in the inner circumference of the jig so as to extend from each opening portion 41 in the direction in which the lens block will be extracted. The adhesive 62 can pass through the groove 63. Of course, the swelling of the adhesive 62 has to be restricted to be low enough to be put in the depth of the groove 63. When a bottom surface 63a of the groove 63 is tapered to expand in the direction in which the lens block will be extracted, the lens block can be extracted easily.

The spacer rings 31, 35 and 37 are used when there is a large distance between adjacent lens elements or when there is a large difference in outer diameter between adjacent lens elements. It is also preferable that each abutment shape between the spacer ring 31, 35, 37 and the lens element 30, 32-34, 36, 38 is formed into a surface-contact or point-contact shape in section.

Assume that a lens block is arranged so that a first lens element having a large diameter, a second lens element having a diameter smaller than the first lens element, and a third lens element having a diameter larger than the second lens element are arrayed in this order along one way of the optical axis 18a. In this case, the lens block cannot be removed from an integrated jig 40. In such a case, the jig may be arranged as a split type in which the jig is radially split into two. In this event, it is preferable to provide a draft in an edge of each lens element. The jig is not limited to the two split type but it may be formed as a three or more split type.

The first lens group 17 extracted from the jig 40, that is, the lens block is fixed to the first lens holding frame 20 serving as a product. The first lens holding frame 20 is constituted by a plurality of radially divided parts. After the plurality of divided parts are combined with the lens block from a direction crossing the optical axis 18a, the divided parts are fixed to each other by a fixing means such as screwing from the direction where the divided parts are combined with the lens block. Thus, the first lens holding frame 20 is made up. As a result, the first lens holding frame 20 holds the lens block by means of the stepped portion 20a and the press portion 20b so as to position the lens block in the direction of the optical axis 18a as shown in FIG. 2. In this event, not to say, a part or all of the inner surface of the first lens holding frame 20 is brought into abutment against a part or all of the outer circumference of the lens block. Thus, the center of the lens block can be positioned and aligned to the optical axis 18a. The second lens holding frame 22 is attached to the first lens holding frame 20 and integrated therewith. Thus, the projection lens 15 is made up. In the projection lens 15, a mounting flange portion 22a is provided. The flange portion 22a is fixed to a mounting portion 12a etc. provided in the housing of the projector unit 12 by a fixing means such as screwing. Thus, the projection lens 15 is fixedly positioned in a position where image light generated by the image light generating portion 16 can be projected on the rear screen.

When the first lens holding frame 20 has an integrated structure in which the first lens holding frame 20 is not constituted by divided parts, the first lens group 17 is inserted into the cylindrical portion from the small-diameter lens element 38 side. Thus, of the first lens group 17, a part of the lens elements abut against the stepped portion 20a formed in the inner circumference of the first lens holding frame 20 so that the first lens group 17 is positioned in the direction of the optical axis 18a. Not to say, a part of the inner surface of the first lens holding frame 20 is brought into abutment against a part of the outer circumference of the first lens group 17 so that the center of the first lens group 17 can be positioned and aligned with the optical axis 18a. After that, the lens block and the first lens holding frame 20 are fixed by a fixing means. As the fixing means, the first lens element 30 in the opposite end to the insertion direction may be fixed to the first lens holding frame 20 by use of adhesive, a snap ring or the like.

The rear projector 10 may has rear screens 11 of different sizes. In this case, the screen size and the distance to the screen change in accordance with each screen size. Therefore, optical systems different in focal length and focal position are used. When an optical system whose focal length and focal position can be adjusted is used, a part of the optical systems can be used and shared for the different screen sizes. The lens position of the first lens holding frame used in this embodiment changes in accordance with each screen size so that the first lens group 17 serving as a lens block can be shared for the different screen sizes. The first lens holding frame 20 may be held movably forward/backward in the direction of the optical axis 18a by a helicoid mechanism or the like so that the focal length and the focal position can be adjusted.

The first lens group 17 serving as a lens block has a configuration in which the lens elements 30, 32-34, 36 and 38 are bonded with each other and the lens elements 30, 32, 34, 36 and 38 are bonded with the spacer rings 31, 35 and 37. However, the first lens group 17 may have a configuration in which only the lens elements are bonded without using the spacer rings 31, 35 and 37. Alternatively, the first lens group 17 may have a configuration in which a spacer ring is inserted between every adjacent ones of the lens elements.

Further, the following configuration may be used. That is, a plurality of lens elements are incorporated in a lens barrel manufactured precisely as a product, and fixed thereto in advance. The jig 40 is used when the lens barrel is bonded to other lens elements. Furthermore, the aforementioned first lens element 30 is a resin-laminated lens in which a glass layer and a synthetic resin layer have been bonded. In addition to such a material, lens elements made of plastic materials other than glass may be used. According to the invention, there is no problem in this case. For the integrated structure is formed only using adhesive without being heated to a high temperature.

The aforementioned embodiment has been described only about a rear projector using an optical path bending mirror. However, the invention is not limited to this. The invention is also applicable to optical equipment using optical systems, such as a rear projector using no optical path bending mirror, a projector for projecting image light on the front surface of a screen, a camera, a copying machine, etc.

What is claimed is:
1. A lens block having an optical axis comprising:
a plurality of lens elements configured to form at least a portion of an optical system, wherein:
at least two or more of the lens elements are positioned to be abutting against one another at peripheral portions of the lens elements to form a peripheral abutment joint there between, with the lens elements being located in a predetermined order within the lens block as viewed along the optical axis, and
each peripheral abutment joint has at least three adhesive bonds formed so as to be spaced apart in at least three corresponding spaced positions in a circumferential direction around each associated peripheral abutment joint with the spaced adhesive bonds each contacting an exterior surface of each abutting lens element and the abutment joint there between, the spaced at least three adhesive bonds so formed permitting the lens block to be handled as an integral unit.

2. A lens block having an optical axis comprising:
a plurality of lens elements configured to form at least a portion of an optical system; and
spacer rings that position spaces between at least two or more of the lens elements, wherein:
at least two of the lens elements are positioned to be abutting against one another at peripheral portions of the lens elements to form a peripheral lens abutment joint there between, and at least one of the elements and at least one of the spacer rings are positioned to be abutting against one another at peripheral portions of the at least one lens element and the at least one spacer ring to form a peripheral lens element to spacer ring abutment joint with the lens elements and spacer rings being located in a predetermined order within the lens block as viewed along the optical axis, the spacer rings providing desired spacing among the lens elements along the optical axis, and
each peripheral lens abutment joint and each peripheral lens element to spacer ring abutment joint has at least three adhesive bonds formed so as to be spaced apart in at least three corresponding spaced positions in a circumferential direction around each associated peripheral abutment joint between abutting lens elements and each associated peripheral lens element to spacer ring abutment joint, the spaced at least three adhesive bonds so formed permitting the lens block to be handled as an integral unit.

3. The lens block according to claim 1, wherein the lens block is manufactured by using a jig comprising:
a cylindrical portion into which the lens elements are inserted so that the lens elements are aligned in the predetermined order;
a reception portion provided at an end of the cylindrical portion in an insertion direction, the reception portion that receives the lens element first inserted into the cylindrical portion;
a plurality of positioning-surface portions provided in an inner circumferential surface of the cylindrical portion, the positioning-surface portions centrally align each of the lens elements; and
a plurality of channel openings formed through the cylindrical portion and in communication with the lens block at the at least three corresponding positions where each of the at least three adhesive bonds are applied.

4. The lens block according to claim 2, wherein the lens block is manufactured by using a jig comprising:
a cylindrical portion into which the lens elements are inserted so that the lens elements are aligned in the predetermined order;

a reception portion provided at an end of the cylindrical portion in an insertion direction, the reception portion that receives the lens element first inserted into the cylindrical portion;

a plurality of positioning-surface portions provided in an inner circumferential surface of the cylindrical portion, the positioning-surface portions centrally align each of the lens elements; and a plurality of channel openings formed through the cylindrical portion and in communication with the lens block at the at least three corresponding positions to which where the adhesive bonds are applied.

5. The lens block according to claim 1, wherein:
adjacent lens elements have the same diameter, or
of adjacent lens elements, one lens element is disposed downstream in an insertion direction and has a smaller diameter than the other lens element disposed upstream in the insertion direction.

6. The lens block according to claim 2, wherein:
adjacent lens elements have the same diameter, or
of adjacent lens elements, one lens element is disposed downstream in an insertion direction and has a smaller diameter than the other lens element disposed upstream in the insertion direction.

7. A lens holder for the lens block according to claim 1, the lens holder comprising:
a cylindrical portion covering at least a portion of an outer circumference of the lens block; and
a holding unit to maintain the position of the lens block provided in the cylindrical portion, the holding unit positions the lens block in the optical axis direction and directs adjustment along a direction crossing the optical axis direction.

8. A lens holder for the lens block according to claim 2, the lens holder comprising:
a cylindrical portion covering at least a portion of an outer circumference of the lens block; and
a holding unit to maintain the position of the lens block provided in the cylindrical portion, the holding unit positions the lens block in the optical axis direction and directs adjustment along a direction crossing the optical axis direction.

9. A projector using the lens holder according to claim 7, comprising:
a fixing unit that positions and secures the lens holder in a predetermined position so that the lens block constitutes a part of a projection lens.

10. A projector using the lens holder according to claim 8, comprising:
a fixing unit that positions and secures the lens holder in a predetermined position so that the lens block constitutes a part of a projection lens.

11. The lens block according to claim 1, wherein each abutment joint is formed with a space resulting from at least a part of the exterior surface of each of the abutting lens elements being in different planes adjacent to the abutment joint, each space being filled by adhesive from each spaced adhesive bond.

12. The lens block according to claim 2, wherein each abutment lens joint is formed with a first kind of space resulting from at least a part of the exterior surface of each of the abutting lens elements being in different planes adjacent to the lens element abutment joint, each first kind of first space being filled by adhesive from each spaced adhesive bond.

13. The lens block according to claim 12, wherein each peripheral lens element to spacer ring abutment joint is formed with a second kind of space resulting from at least a part of the exterior surface of the peripheral lens element and spacer ring being in different planes adjacent to the lens element to spacer ring abutment joint, the second kind of space being filled by adhesive from each spaced adhesive bond.

* * * * *